(12) United States Patent
Gelfand et al.

(10) Patent No.: US 10,248,725 B2
(45) Date of Patent: Apr. 2, 2019

(54) METHODS AND APPARATUS FOR INTEGRATING SEARCH RESULTS OF A LOCAL SEARCH ENGINE WITH SEARCH RESULTS OF A GLOBAL GENERIC SEARCH ENGINE

(71) Applicant: Gartner, Inc., Stamford, CT (US)

(72) Inventors: Michael Gelfand, Rehovot (IL); Zeevi Michel, Tel Aviv (IL); Nir Polonsky, Ridgefield, CT (US)

(73) Assignee: Gartner, Inc., Stamford, CT (US)

( * ) Notice: Subject to any disclaimer, the term of this patent is extended or adjusted under 35 U.S.C. 154(b) by 354 days.

(21) Appl. No.: 14/992,232

(22) Filed: Jan. 11, 2016

(65) Prior Publication Data

US 2016/0357756 A1 Dec. 8, 2016

Related U.S. Application Data

(60) Provisional application No. 62/169,591, filed on Jun. 2, 2015.

(51) Int. Cl.
| | | |
|---|---|---|
| *G06F 7/00* | (2006.01) | |
| *G06F 17/30* | (2006.01) | |
| *H04L 29/08* | (2006.01) | |

(52) U.S. Cl.
CPC ........ *G06F 17/30864* (2013.01); *H04L 67/22* (2013.01); *H04L 67/306* (2013.01)

(58) Field of Classification Search
CPC ........... G06F 17/3053; G06F 17/30554; G06F 17/30864; G06F 17/30321; H04L 67/22; H04L 67/306
See application file for complete search history.

(56) References Cited

U.S. PATENT DOCUMENTS

| 8,244,674 B2 | 8/2012 | Davis et al. | |
|---|---|---|---|
| 8,661,034 B2 | 2/2014 | Polonsky et al. | |
| 8,918,391 B2 | 12/2014 | Polonsky et al. | |
| 2006/0026147 A1* | 2/2006 | Cone ................. | G06F 17/30867 |
| 2006/0036582 A1* | 2/2006 | Sondergaard ..... | G06F 17/30864 |
| 2008/0222122 A1* | 9/2008 | Morita .............. | G06F 17/30864 |

(Continued)

OTHER PUBLICATIONS

Senexx, Inc., SolvePath: Investor Overview, Apr. 2014, 11 pages.
Senexx, Inc., SolvePath: User Guide, Apr. 2014, 10 pages.

*Primary Examiner* — Hasanul Mobin
(74) *Attorney, Agent, or Firm* — Lipsitz & McAllister, LLC

(57) ABSTRACT

Methods and apparatus for simultaneously searching public and private information sources are provided. When a user implements a key word search of a public search engine via a web browser, the same key word search is automatically simultaneously implemented of a private information source to locate at least one of user contacts and documents relevant to the key word search. The user contacts and/or the documents returned from the private information source may be scored for relevancy to the key word search. Public search results are returned to the user based on the key word search of the public search engine. In addition, up to N most relevant of the at least one of the user contacts and the documents obtained from the private information source may be returned to the user in a side bar of the web browser adjacent to the public search results.

23 Claims, 6 Drawing Sheets

Enrichment of search results with people related to search query and to User

(56) References Cited

U.S. PATENT DOCUMENTS

| | | | |
|---|---|---|---|
| 2008/0222295 A1* | 9/2008 | Robinson | G06F 17/30867 |
| | | | 709/227 |
| 2010/0145937 A1* | 6/2010 | Davis | G06F 17/30699 |
| | | | 707/728 |
| 2010/0205541 A1* | 8/2010 | Rapaport | G06Q 10/10 |
| | | | 715/753 |
| 2010/0250578 A1* | 9/2010 | Athsani | G06F 17/30867 |
| | | | 707/765 |
| 2011/0191311 A1 | 8/2011 | Polonsky et al. | |
| 2012/0078870 A1* | 3/2012 | Bazaz | G06F 17/30247 |
| | | | 707/706 |
| 2012/0110323 A1* | 5/2012 | Colclasure | G06F 17/30106 |
| | | | 713/153 |
| 2013/0073473 A1* | 3/2013 | Heath | G06Q 30/02 |
| | | | 705/319 |
| 2013/0219176 A1* | 8/2013 | Akella | H04L 63/0815 |
| | | | 713/165 |
| 2013/0325839 A1* | 12/2013 | Goddard | G06F 17/30867 |
| | | | 707/708 |
| 2014/0067535 A1* | 3/2014 | Rezaei | G06F 17/30598 |
| | | | 705/14.54 |
| 2014/0067702 A1* | 3/2014 | Rathod | G06Q 10/10 |
| | | | 705/319 |
| 2014/0108395 A1 | 4/2014 | Polonsky et al. | |
| 2014/0257890 A1 | 9/2014 | Polonsky et al. | |
| 2014/0358909 A1* | 12/2014 | Kolba, Jr. | G06F 17/3053 |
| | | | 707/723 |
| 2015/0058380 A1 | 2/2015 | Polonsky et al. | |
| 2015/0213096 A1* | 7/2015 | Montgomery | G06F 17/30554 |
| | | | 707/722 |
| 2015/0331948 A1* | 11/2015 | Arning | G06F 17/30864 |
| | | | 707/706 |

\* cited by examiner

METHODS AND APPARATUS FOR INTEGRATING SEARCH RESULTS OF A LOCAL SEARCH ENGINE WITH SEARCH RESULTS OF A GLOBAL GENERIC SEARCH ENGINE

This application claims the benefit of U.S. provisional patent application No. 62/169,591 filed on Jun. 2, 2015, which is incorporated herein and made a part hereof by reference.

BACKGROUND OF THE INVENTION

The present invention relates to the field of item and peer recommendation algorithms directed towards industry professionals. More specifically, the present invention is aimed at enabling simultaneous search of public information sources and private information sources and providing combined search results.

Most business users turn to public generic search engines such as Google, Bing, Yahoo or the like, to look for answers, resources, products, options, etc. needed to address their business plan points, agendas, informational needs, expert needs, challenges, etc.

Such generic search engines have a few intrinsic advantages. For example, the user can use same search engine for private/consumer and professional/business search activity. In addition, the search query processing benefits from the large scale of such search engines both in terms of statistical tools applied to analyzing the query and the vast number of results which are indexed and available.

However, the large scale aspect of such public generic search engines is, however, a double edged sword. In a business context, the best answer to a search query may reside locally behind a firewall or within non-public databases, which content is not available to the generic/public search engine for indexing. Furthermore, the relevant business environment (company, association, user groups, subscription service, etc.) may have "experts" that can answer the query and/or assist the user beyond the initial question and answer event, hence creating significant business value. Those expert are most likely unknown to the generic search engine since their explicit and/or implicit profiles and activity likely reside behind a firewall and there is no object that identifies them as such experts that can be indexed by the generic engine.

Since a search engine that will identify local answers, documents, resources and experts does not have the large scale advantage of a generic search engine, it would be advantageous to use a "locally optimized" small scale search logic to identify local information, documentation, and experts in connection with a generic global search engine. It would be advantageous to integrate local results from a local search engine (searching non-public information) with the global (public) results from the generic search engine when conducting a search query on a generic search engine.

The methods and apparatus of the present invention provides the foregoing and other advantages.

SUMMARY OF THE INVENTION

The present invention provides methods and apparatus for integrating search results of a local search engine with search results of a global generic search engine when conducting a search query on a generic search engine.

The present invention enables simultaneous searching of public information sources and private information sources. Such private information sources include existing private search engines, local networks, expert networks, internal directories (e.g., LinkedIn, company directories, user contact files, and the like), private domains, private research databases, private informational databases, private recommendation engines used for returning documents and/or expert recommendations in response to the search query, and other private information sources, whether residing behind a firewall or which have access requirements (e.g., user name and password, authorization codes, or the like). The present invention assumes that such private information sources exist and can be or are already indexed. By integrating a widget or other software module (or the like) into a user's browser, or by using a specialized browser, a global search conducted using a generic search engine such as Google, Bing, Yahoo, or other known search engine will also provide results from the private information sources. Any required access information, such as user names or passwords, click through agreements, authorization codes, or the like are provided in advance by the user for use by the software module to automatically access the private information sources in connection with the search.

For example, the user may initiate a public search using key words and a generic browser or other public search box. The key words entered into the browser or search box are also sent to a private information source, such as a private search or recommendation engine (e.g., such as those developed by Gartner, Inc. and Senexx, Inc.). The access information for accessing the recommendation engine or other private data sources are automatically entered such that, while the generic browser executes the search, the key words are simultaneously mapped (or if a natural language search string is used, the search string concepts are processed, mapped, and/or weighted instead) to the expert network ontology and/or documents or processed using the recommendation engine.

The recommendation engine can then determine the best experts and/or documents to return for the key words and/or concepts from the non-public data, leveraging the user's profile information (whether explicit and/or implicit). The search results are then presented together with the results obtained by the generic search engine and returned to the user (in a federated or non-federated manner).

In accordance with one example embodiment of the present invention, a computerized method for simultaneously searching public and private information sources is provided. In such a method, a user implements a key word search of a public search engine via a web browser. Simultaneously, the same key word search is automatically implemented of a private information source to locate at least one of user contacts and documents relevant to the key word search. The at least one of the user contacts and the documents returned from the private information source may be scored for relevancy to the key word search. Public search results are returned to the user based on the key word search of the public search engine. In addition, up to N most relevant of the at least one of the user contacts and the documents obtained from the private information source may be returned to the user in a side bar of the web browser adjacent to the public search results.

The private information source may comprise one of a private search engine, information residing on a local network, an expert network, an internal directory, a private domain, a private research database, a private information database, a document recommendation engine, an expert recommendation engine, or the like.

The method may further comprise enabling access to the private information source by automatically logging into the private information source using stored access information for the private information source.

In addition, the method may also comprise connecting to external user accounts and analyzing the external user accounts to locate information comprising at least one of the user contacts, contact information, documents associated with the user contacts, and the like. The user contacts, the contact information, and the documents (and any other relevant information) may then be indexed and stored. The information may be extracted from the external accounts and tagged to indicate important topics or areas of strength of the corresponding contact.

The information extracted from the external accounts may comprise at least one of contact name, photo, bio, experience summary, skill set, background, associated groups or affiliations, or the like.

In one example embodiment of the present invention, the private information source may comprise a recommendation system. In such a method, an implicit profile of the user may be created or updated with the indexed user contacts, the indexed contact information, the indexed documents, and the like. The implicit profile may also comprise user-related information derived from tracking the user's behavior on at least one of one or more electronic devices, an electronic communications network, a website used to access the recommendation system, and the like. The user-related information derived from the user behavior may be analyzed to extract or derive key words therefrom which may be used to characterize user interests, expertise, skills, and the like. The key words may be stored in a profiles database as the implicit profile.

As an example, the user's actions on the web browser used to implement the key word search may be tracked. The user's implicit profile may be updated based on the user's actions. Such user actions may comprise at least one of key word searches entered, the public search results viewed by the user, the user contacts from the private information source contacted, the documents returned from the private information source viewed by the user, and the like.

At least one of the indexing of the user contacts, the contact information, and the documents, and the updating of the implicit profile may occur at least one of periodically, at user login to the private information source, and upon a change in one of the user external accounts. In embodiments where the indexing and updating occurs periodically, the period of the indexing and updating may be configurable by the user or a system administrator.

The user contacts may comprise direct user contacts and indirect user contacts obtained or derived from the direct user contacts.

The scoring of the user contacts and the documents returned from the private information source may further comprise ordering of the user contacts and the documents by relevancy to key words or topics derived from at least one of the key word search or the public search results. The key words or topics may be extracted from the at least one of the key word search and the public search results using natural language processing techniques. The user contacts or the documents with relevancy to more than one of the topics or key words may be scored higher than the user contacts or the documents having relevancy to only one of the topics or key words.

In an example embodiment of the present invention in which the private information source comprises a recommendation system, the method may further comprise storing information relating to the topics and key words in a database of the recommendation system.

The recommendation system may comprise at least one of a document database for the documents or an expert database identifying experts and corresponding areas of expertise. In addition to returning the user contacts and/or documents from the private information source, identifying information for the experts obtained from the expert database which are relevant to the key word search may be returned to the user.

In a further example embodiment, in the event at least N of the user contacts and/or the documents are not returned in the key word search, the method may further comprise deriving one or more topics from the key word search and expanding the scope of the search of the private information source to include at least one parent or child topics corresponding to the one or more topics. The at least one of the parent or the child topics may be obtained from a taxonomy database comprised of stored topics together with the parent and the child topics corresponding thereto in a hierarchical relationship. The user contacts or the documents returned using the at least one of the parent or the child topics may be weighted less than the user contacts or the documents returned from the key word search.

The user contacts which have a perceived or express willingness to cooperate may be scored higher than other of the user contacts. The willingness to cooperate may be determined by at least one of the user contact being from one of a same company, team, or company level as the user, the user contact having an available communication channel, the user contact having a past history of cooperation, the user contact being obtained from direct contacts of the user, and the like.

The method may further comprise, for each of the up to N of the user contacts, displaying in the side bar of the web browser at least one of a name of the user contact, contact information, embedded links for contacting the contact via email, instant messaging, texting, or telephone, a photo, a bio, a summary of the contact's relevancy to the key word search, an experience summary, a skill set description, a background summary, a listing of associated groups or affiliations, and the like.

The key word search of the private information source may be implemented via a software widget associated with the web browser or via a specialized web browser adapted to access the private information source.

The present invention also encompasses a computerized system for simultaneously searching public and private information sources. In an example embodiment, the system may comprise a web browser enabling a user to implement a key word search of a public search engine and a software application associated with the web browser for accessing a private information source and implementing the key word search of the private information source to locate at least one of user contacts and documents relevant to the key word search. The private information source may be adapted to score the at least one of the user contacts and the documents returned from the key word search for relevancy to the key word search. The public search results obtained from the key word search of the public search engine may be displayed on the web browser. In addition, up to N most relevant of the at least one of the user contacts and the documents obtained from the private information source may be displayed in a side bar of the web browser adjacent to the public search results.

In an example embodiment of the present invention, the private information source may comprise a recommendation system. The recommendation system may be provided with access information for connecting to external user accounts. The recommendation system may access the external user accounts to locate at least one of the user contacts, contact information, documents associated with the user contacts, and the like. The recommendation system may then index the user contacts, the contact information, the documents and other relevant information, and store the indexed user contacts, the indexed contact information, the indexed documents, and the like.

The system may include other features and functionality as described above in connection with the example method embodiments.

The system may record user clicks and provide feedback to the recommendation engine, and this information may be used to update the user's explicit and/or implicit profiles. For example, the user's implicit profile may comprise user-related information derived from tracking the user's behavior on at least one of one or more electronic devices, an electronic communications network, and a website used to access a recommendation engine and analyzing the user-related information derived from the user behavior to extract or derive key words therefrom which are used to characterize user interests, expertise, and skills, and storing the key words in a profiles database as the implicit profile.

With the present invention, the system may track the user's actions on the web browser used to access the system or the public search engine. The user's implicit profile may be updated based on the user's actions. The user's actions may comprise at least one of the key word searches entered, the public search results viewed, the user contacts from the private information source contacted, the documents obtained from the private information source viewed, and the like.

It would also be beneficial, however, for local NLP based search logic (running on the recommendation engine or other private information source) to also take the public search results (e.g., the Google subject line of the result and related snippet, and/or potentially the full result page), process it to identify new concepts that the generic search engine implicitly associated with the query, score those concepts based on local rules, and expand its own concept tree associated with the specific query using the highest-score concepts from the global generic search. The search can then be run again on the recommendation engine or other private information source with this expanded concept tree and offer an improved local and expert result set. The expanded concept tree or information related thereto can be stored in the corresponding local database to enhance the database (e.g., the recommendation engine can learn from the public search result and can use this data to improve future searches of the recommendation engine database).

It should be appreciated that although certain embodiments of the present invention are described herein as employing a recommendation engine, the present invention also encompasses embodiments in which a recommendation engine is not present, and instead the search results from private data sources are returned using an application program interface that connects with the private data sources and obtains the search results, without passing through a recommendation engine for optimization of the search results. However, the use of a recommendation engine with the present invention is advantageous as it enables optimization of the search results as well as self-learning and constant updating of the recommendation engine database.

The present invention provides a significant advantage by allowing a local private search to ride on a global/public generic search. For example, the present invention allows a user to initiate their search in a generic public search engine, provides the user with a global set of answers using globally optimized generic logic, and also provides the user with a local set of answers obtained from private information sources, including experts and/or documents, using locally optimized logic. The present invention leverages the statistical accuracy and richness of the global generic search to improve and iterate the local search concept tree and/or similar logic components.

The system requires the user to implement a local search widget or the like in their browser, or a specialized browser. It also assumes a generic/public search engine is available. The recommendation engine may include or comprise an example of a locally optimized NLP search implementation (such as the "Senexx People Search" or the SolvePath document search methodology, both provided by Senexx, Inc.).

The present invention may also be expanded to non-public search boxes, e.g., to an intranet search box or a particular domain search box as well (e.g., such that the widget or software module is implemented in the non-public/domain specific search box and returns results not only from that non-public search but from other private information sources as well).

Similarly, although the invention is described herein as producing combined search results commencing with a search initiated in a public search engine, those skilled in the art will appreciate that the invention may be implemented such that a local search on a recommendation engine or on one or more private information sources initiates a simultaneous search using a public search engine. In other words, instead of entering a search string in a Google search box and having public and private information sources searched, the search string can be entered into a private search engine with both private and public search results being returned. In such an embodiment, the widget or software module can be implemented in one or more private search boxes and can be configured to access one or more public search engines and/or one or more additional private information sources.

BRIEF DESCRIPTION OF THE DRAWINGS

The present invention will hereinafter be described in conjunction with the appended drawing figures, wherein like reference numerals denote like elements, and.

DETAILED DESCRIPTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

Figure 1:
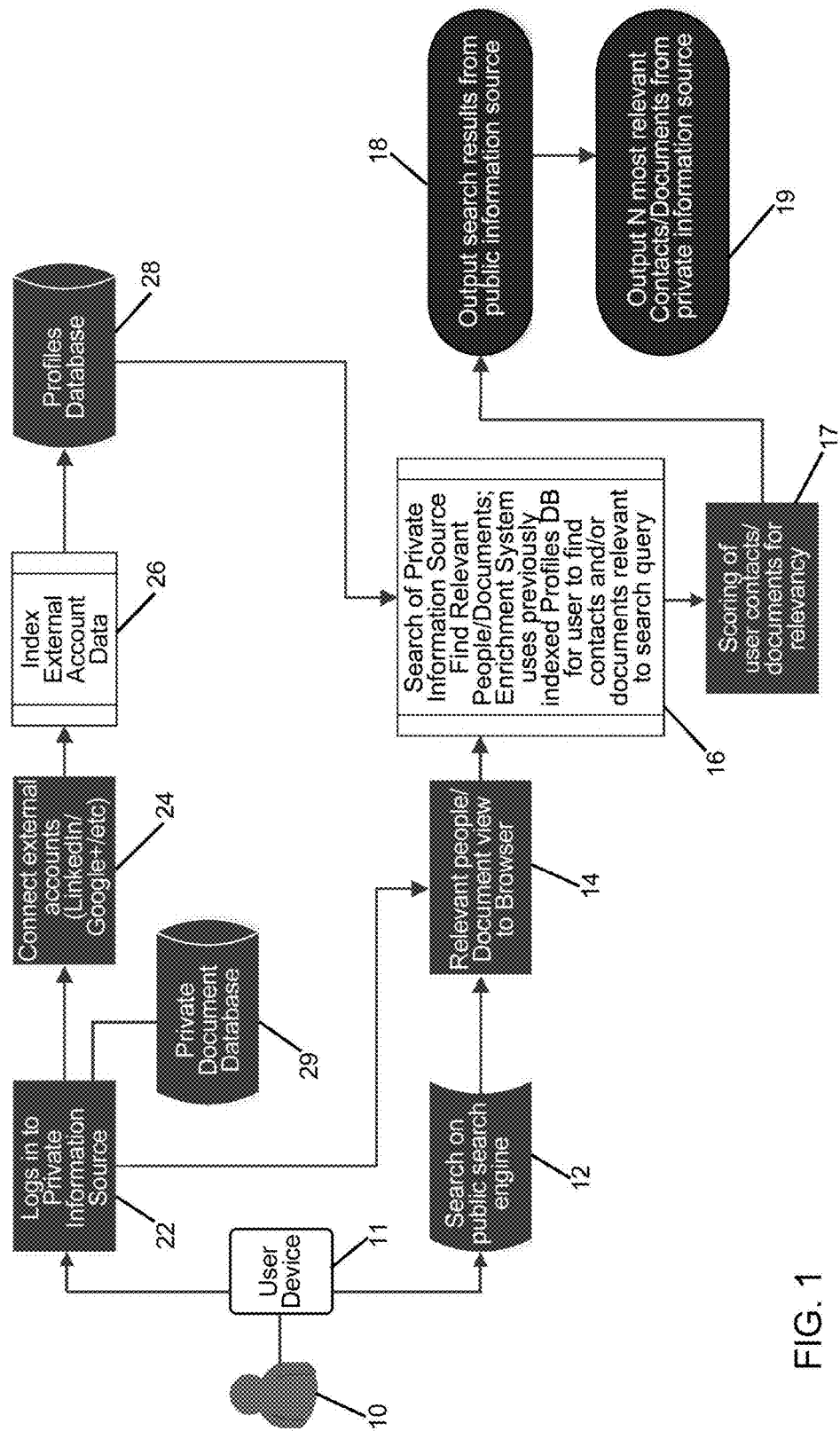
FIG. 1 shows a flow chart of an example embodiment of a search process combining global and local search result in accordance with the present invention.

FIG. 1 illustrates an example embodiment of simultaneous searching of public information sources and private information sources in accordance with the present invention. The present invention assumes that a private search network source exists, such as private search engines, information residing on private local networks, expert networks, internal directories, private domains, private research databases, private information databases, and document and expert recommendation engines as discussed above, for returning documents and/or expert recommendations in response to the search query, and assumes that such private information sources can be or are already indexed.

Such private network information sources, such as document and expert recommendation engines, are well-known. Most such systems employ a profile database which stores an explicit profile of each of the users of the system. An explicit profile may include information that generally defines the user based on the user's direct input into the system. This is usually derived from registration forms where the user has input his industry experience, job titles and duty descriptions, size of company, company name, projects he is working on, vendors he is working with, etc. Recommendation engines of the type developed by Gartner, Inc. and Senexx, Inc. use not only an explicit profile of the user but also an implicit profile of the user derived from a user's behavior, for example from tracking a user's actions on one or more electronic devices and/or on the web site used to access the inventive system. An example of an implicit profile is discussed in U.S. application Ser. No. 14/533,398 entitled Implicit Profile for Use With Recommendation Engine and/or Question Router, owned by Gartner, Inc., which is incorporated herein and made a part hereof for all purposes.

In addition to personalized types of expert and document recommendation engines of the type discussed above, non-personalized document and expert recommendation engines (i.e., those that do not utilize user profiles) can also be employed with the present invention.

As shown in FIG. 1, a user 10 may implement (12) a key word search of a public search engine via a web browser (e.g., running on user device 11). Simultaneously, the same key word search is automatically implemented (16) of a private information source to locate at least one of user contacts and documents relevant to the key word search. The at least one of the user contacts and the documents returned from the private information source are scored (17) for relevancy to the key word search. The public search results are returned (18) to the user based on the key word search of the public search engine. Up to N most relevant of the at least one of the user contacts and the documents obtained from the private information source are also returned (19) to the user in a side bar of the web browser adjacent to the public search results.

The term documents should be understood to mean any one of articles, white papers, information texts, published documents, books, research papers, web pages, reports, manuals, spreadsheets, presentations, pamphlets, brochures, user manuals, product instructions, product descriptions, specifications, reviews, thesis papers, journals, blogs, RFPs, proposals, press releases, or other written text that may be maintained or stored in electronic form.

In one example embodiment, when a user 10 logs onto (22) a private information source or onto a recommendation engine (also referred to herein and in the drawings as "enrichment system"), the system may connect (24) to external user accounts (provided access is granted for each such external user account, including any necessary access information such as user name and password, authentication codes, and the like), such as LinkedIn, Google, and the like and analyze the external user accounts to locate information comprising at least one of the user contacts, contact information, and documents associated with the user contacts. This information from the external accounts may then be indexed (26) (explained in detail below in connection with FIG. 2).

The resulting indexed data may be used to create or update the user's profile (explicit or implicit), and stored in a profiles database 28 used by the recommendation engine. The indexing of the external account data and corresponding updating of the user's profile(s) may occur periodically, at user login, after user action is taken with regard to an external account (e.g., updating, adding, or deleting a contact or modifying any other information field, and the like), and the like.

The profiles database 28 may contain individual user profiles, including both explicit and implicit profiles for each user. The implicit profile for each user (stored in the profiles database 28) may also comprise user-related information derived from tracking the user's behavior on at least one of one or more electronic devices (e.g. user device 11), an electronic communications network, a website used to access the recommendation system, and the like. The user-related information derived from the user behavior may be analyzed to extract or derive key words therefrom which may be used to characterize user interests, expertise, skills, and the like. The key words may be stored in the profiles database 28 as the implicit profile.

As an example, the user's actions on the web browser used to implement the key word search may be tracked. The user's implicit profile may be updated based on the user's actions. Such user actions may comprise at least one of key word searches entered, the public search results 18 viewed by the user, the user contacts from the private information source contacted, the documents returned from the private information source viewed by the user, and the like.

Additional information may be used to form the implicit profile, as explained in detail in U.S. Ser. No. 14/533,398.

The user login (22) to the private information source or recommendation engine may require physical user action such as entering a user name and password (e.g., via user device 11), or may be an auto-login implemented by a browser plugin application using stored access information for the private information source. For example, by integrating a widget or other software module into a user's browser, or by using a specialized browser, the user can be automatically logged in to the private information source or recommendation engine once the browser is opened by the user, such that a global search conducted using a generic search engine such as Google, Bing, Yahoo, or other known search engine will also initiate a search on the private information source/recommendation engine. Alternatively, upon opening of the browser, a pop-up menu may appear asking permission for linking to the private information source or recommendation engine, giving the user a choice whether or not to implement the dual search aspects of the present invention.

Once a user opens the browser and access (22) to the private information source/recommendation engine is provided (whether by user login or auto-login), a "relevant people/document view" side bar may be added (14) to the browser display. When the user implements (12) a public search on the browser (e.g., using Google, Yahoo, Bing, or the like), the search query is also analyzed simultaneously (16) by the private information source/recommendation engine and people (known contacts of the user) relevant to the search query are determined (e.g., from the user's profile database 28) and returned and displayed, for example in the relevant people view sidebar.

In a further example embodiment, the side bar may comprise a relevant document view instead of or in addition to the relevant people view side bar. The private information source/recommendation engine may return relevant documents from the indexed documents stored in the profiles database 28, from a private document database 29 or other private information sources, and populate the relevant document view with titles from and links to such relevant documents. The private document database 29 may comprise a recommendation engine document database. The recommendation engine may conduct a search of its entire document database 29 for documents relating to the search query and/or for documents associated with the user or the user's contacts in the user's profiles database 28 related to the search query.

Figure 2:
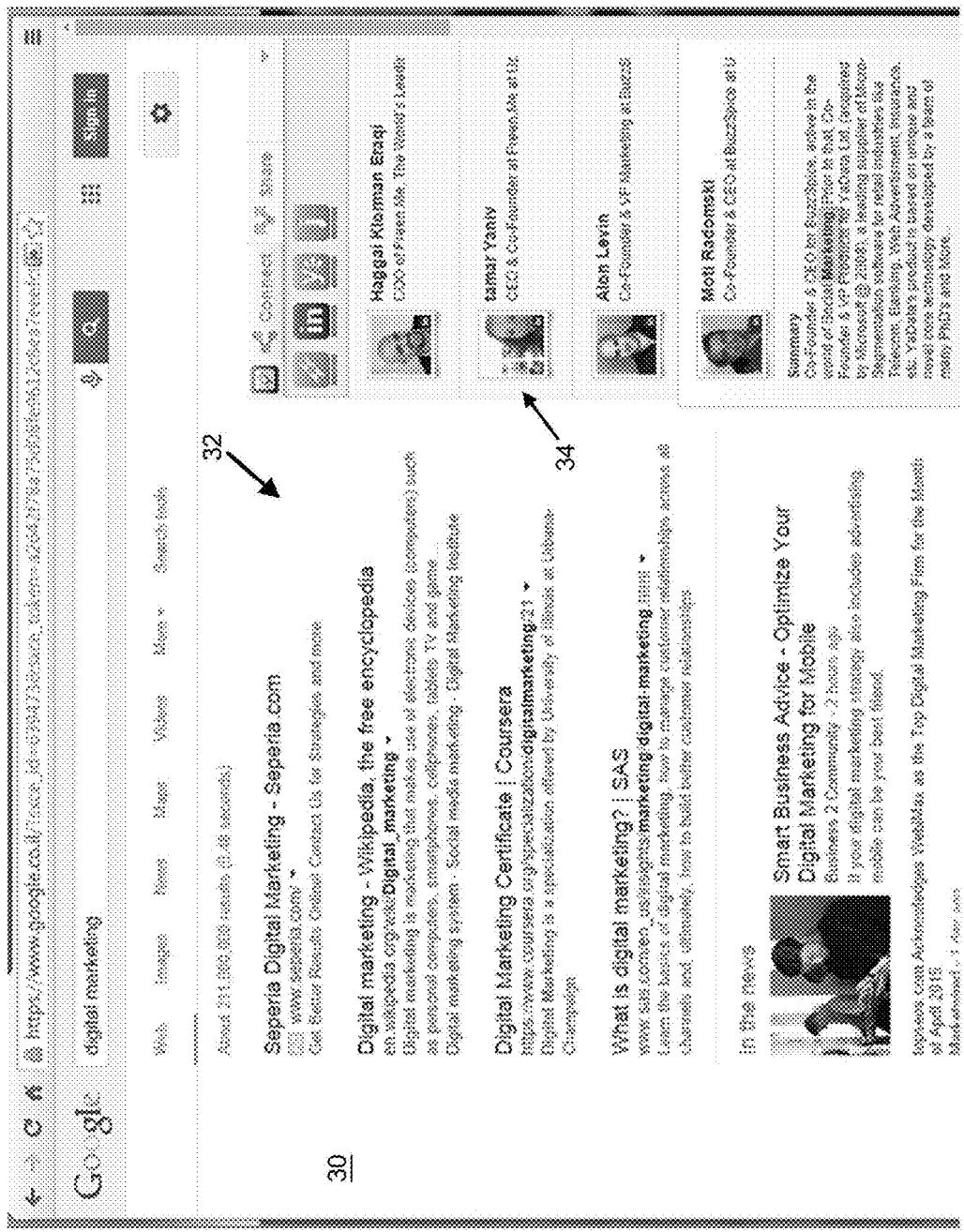
FIG. 2 shows an example embodiment of the presentation of search results in accordance with the present invention.

An example embodiment of the presentation of combined search results in accordance with the present invention is shown in FIG. 2. FIG. 2 shows a sample web browser page 30 with public search results 32 from a Google search for the key words "Digital Marketing" presented in the main portion of the web page 30, with a "people view" sidebar 34 showing contacts returned from an independent search of one or more private information sources that are relevant to the same key words.

A "document view" sidebar (not shown) may be presented in a similar manner, or combined with the "people view" sidebar 34. For example, a menu selection may be provided on the top of the sidebar 34 to enable toggling between people and documents returned by the search of the private information sources.

The user is thus able to see not only the public search results 32 returned by the browser, but also relevant people and/or documents 34 returned by the recommendation engine or other private search engine. The relevant people view sidebar 34 may provide the user with one or more of each person's name, contact information, a photo of the person, a short bio, a summary of the person's relevancy to the search query, an experience summary, a skill set description, a background summary, a listing of associated groups or affiliations, and the like. The user may then be able to initiate contact with a person selected from the sidebar by using corresponding embedded links provided for initiating various forms of communication, such as email, telephone, texting, instant messaging, and the like.

Similarly, document titles may be listed in the sidebar 34 together with a brief summary or description, and the user can select documents from the document sidebar to open, download, print, and/or forward (e.g., via email) to another user or account.

Figure 3:
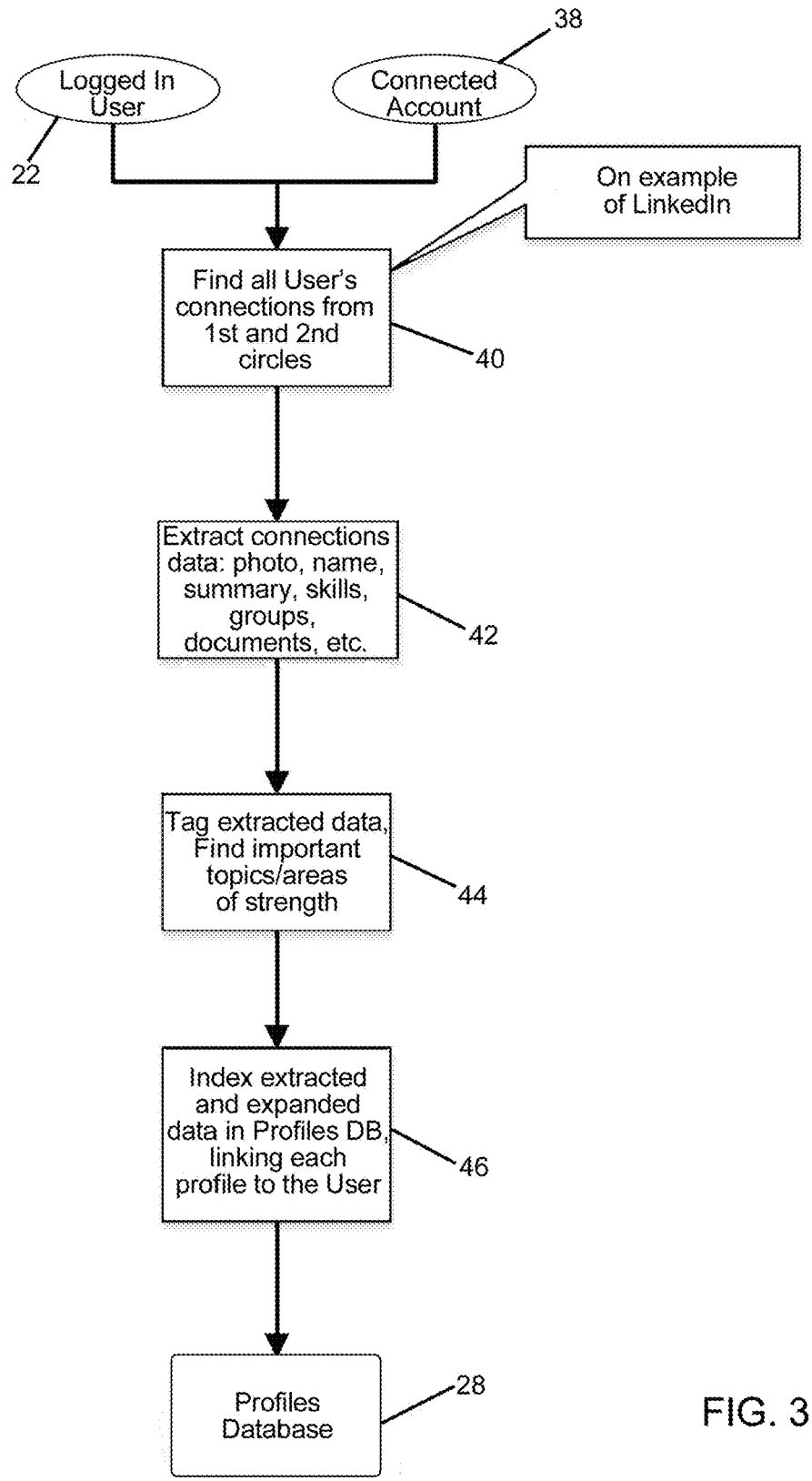
FIG. 3 shows a flow chart of an example embodiment of a sub-process for indexing external user account data in accordance with the present invention.

FIG. 3 illustrates an example embodiment of the sub-process for indexing external account data in accordance with the present invention. Once a user logs into (22) the system (e.g., the recommendation engine/enrichment system, or other private information source), the user's external accounts, such as LinkedIn, Google, Yahoo, and the like (with access thereto previously granted by the user) may also be connected (38) to the system. The external accounts may then be analyzed (40) to find all of the user's contacts or connections. For example, the system can not only locate all of the user's direct contacts (first circle of contacts), but also any indirect contacts derived from the first circle contacts (second circle of contacts), and so on. Relevant information (42) from these contacts can be extracted (e.g., name, photo, bio, experience summary, skill set, background, groups associated with, affiliations, and the like). The external accounts can also be analyzed to locate documents associated with the contacts. The extracted data (contacts, contact information, documents, and the like) may then be tagged (44) to indicate important topics or areas of strength for each contact. The extracted and expanded data may then be indexed (46) in the profiles database 28, creating profiles for each of the user's contacts, and each such profile can be linked to the user's profile. Thus, the user's own contact information from external accounts can be imported into or associated with the user's profile. This information may be part of the user's explicit profile and/or implicit profile.

Figure 4:
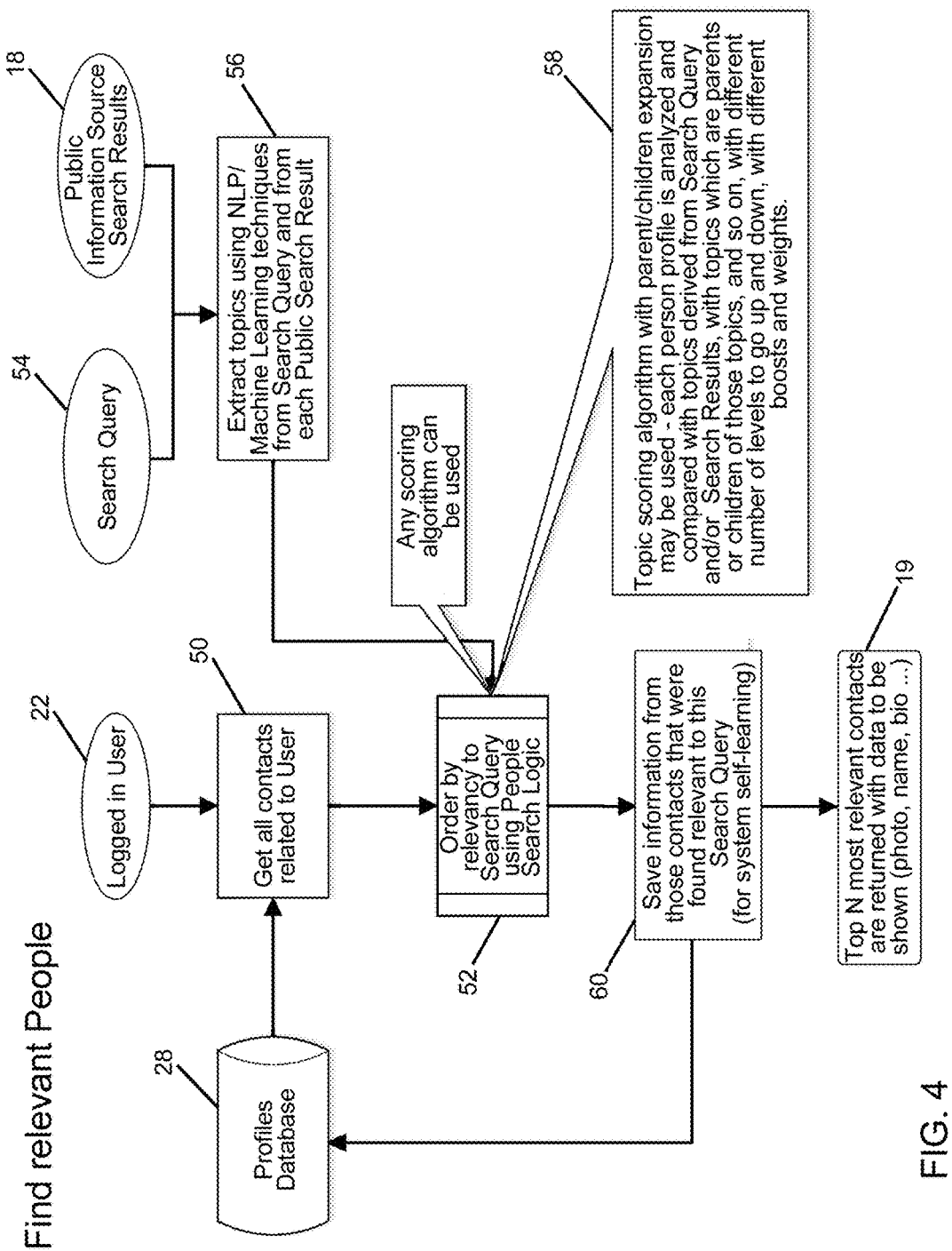
FIG. 4 shows a flow chart of an example embodiment of a sub-process for searching for relevant people in a set of user contacts in accordance with the present invention.

FIG. 4 illustrates an example embodiment of the sub-process for finding relevant people from the indexed contact information in the profiles database 28. Once the user is logged into (22) the system and the user's contacts (e.g., for the case of LinkedIn, including at least first circle contacts) are obtained (50), the contacts may be ordered (52) by relevancy to the search query using People Search Logic (such as Senexx People Search Logic, described in detail below in connection with FIG. 5). In addition, the search results (18) from the public data source returned in response to the search query 54 may also be used in determining relevancy of the contacts and/or documents. Topics and key words may be extracted (56) from search query 54 and/or the search results 18 using Natural Language Processing (NLP) techniques and the contacts can be analyzed (52) for relevancy to the topics. A scoring algorithm may be used to score the topics for relevancy to the search query 54 and to order the user's contacts with respect thereto. Parent/child expansion 58 of the topics may be employed to expand the scope of the people search (as discussed below in connection with FIG. 5), and different weights or scoring may be applied to parents or children of the original topic and people located based on parent/child topic relevancy as compared to relevancy to the original topic.

Once the user's contacts are ordered by relevancy to the search query 54, the public search results 18, and/or topics derived therefrom 56, the resulting relevant contact information, together with the search key words or topic description, may be stored 60 in the profiles database 28 and used to update the user's profile(s) to provide for system self-learning. The system may then output (19) the top N most relevant people/contacts located during the people search, together with the data to be shown in the relevant people view sidebar 34 as discussed above in connection with FIGS. 1 and 2.

Figure 5:
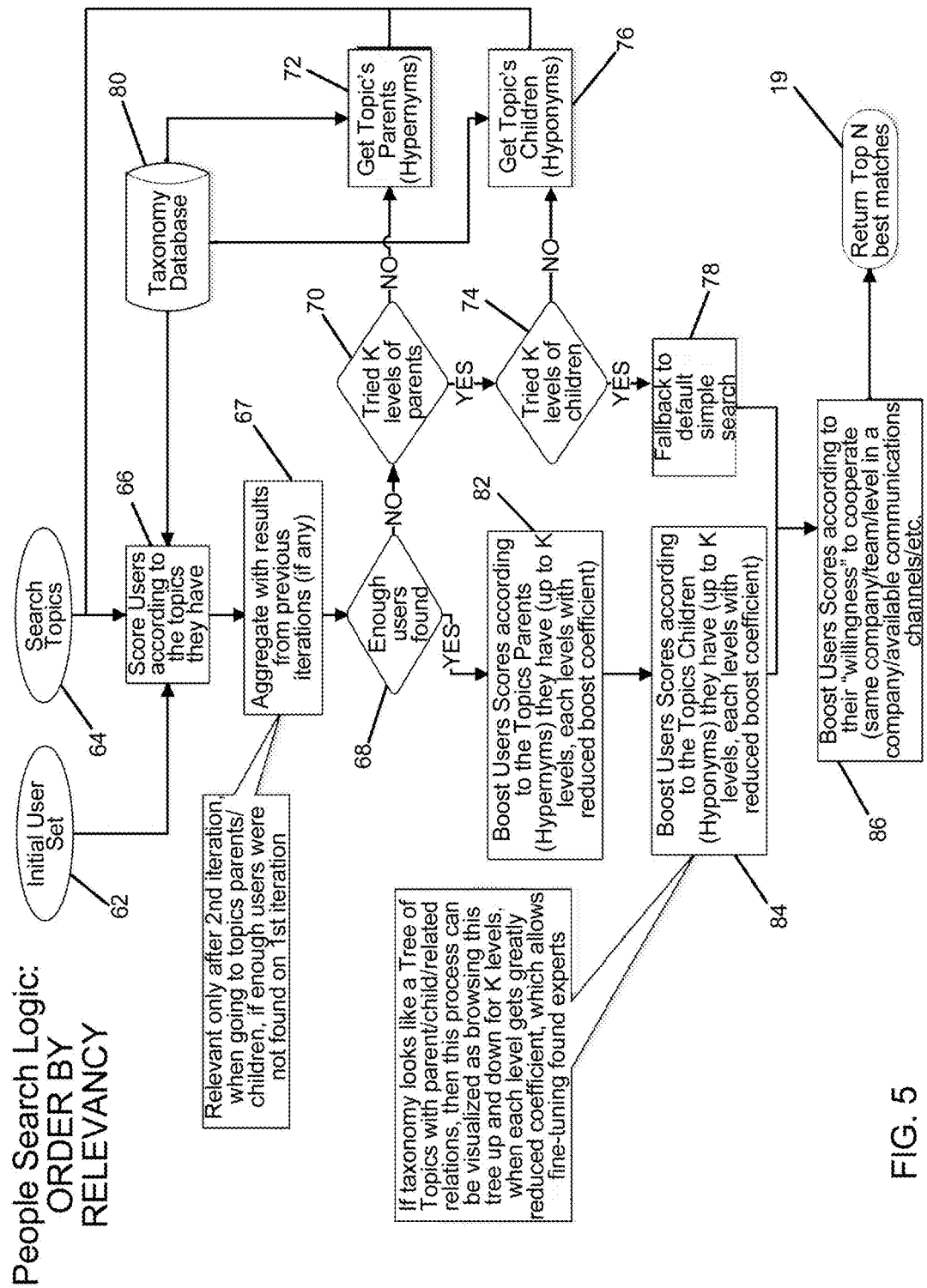
FIG. 5 shows a flowchart of an example embodiment of sub-process for ordering of user contacts by relevancy using concept tree expansion principles.

FIG. 5 illustrates an example embodiment of a people search sub-process. As shown in FIG. 5, the initial user set 62 of all the user's contacts may be obtained. This initial user set 62 may include the user's contacts from all external accounts, such as LinkedIn, Google, Yahoo, any peer connections within the recommendation engine, personnel listings from the user's company, email contacts, social network contacts, and the like. The initial user set may be ordered and filtered or scored for relevancy to the search topics 64 (e.g., topics derived from the search query 54 (also referred to herein as "key word search") or the results 18 returned by the search query as discussed above in connection with FIG. 4) and scored or weighted 66 according to the topics they are found to be relevant to. For example, a higher score or weighting may be provided to contacts who are found to be relevant to a main topic (e.g., a highest weighted topic as determined by relevancy to the search query 54 or search results 18) than those contacts found to be relevant to lesser weighted sub-topics. Contacts with relevancy to more than one topic or key words may be scored higher than those found relevant to only one topic or key word. The extent of the relevancy of the contact to a topic is also considered in the scoring, as is the relevancy of the contact to the user (e.g., a first level contact is weighted higher than a second level contact, a company contact is weighted higher than an outside the company contact, etc.).

A determination (68) can then be made as to whether enough (e.g., a predetermined number N) relevant contacts have been found. If enough relevant contacts are not found, one or more further iterations of the search may be run. For example, if sufficient relevant contacts are not located after the initial search, the topics may be expanded (72) to include parents of the topics. For example, a topic derived from the search query and search results may be "commercial banking". If the search does not reveal a sufficient number of contacts with commercial banking experience, the commercial banking topic may be expanded to a parent topic, e.g., "banking". The contacts are then analyzed again to find any relevant to banking. If a sufficient number of contacts are not located during this process, a parent of "banking" may be used in the search. Once the search is expanded to K levels of parent topics (70) without returning sufficient relevant contacts, the search may be expanded further (76) to include children of the original topic (in this case, for example, the child of "commercial banking" may be "commercial bank loans"). After each iteration of the search, the search results may be aggregated 67 with the search results from the prior search or searches (if any).

If after expanding the search to K levels of children (74) of the original topic, sufficient contacts are not returned, the system may default (78) back to a simple search (e.g., providing only the unfiltered key word search results from the local/private search engine without using topic-based parent/child searching and without using algorithms for sorting or weighting, etc.), and either return no relevant contacts or return any contacts found relevant in the preceding steps even though the predetermined number N of relevant contacts were not located.

A taxonomy database 80 may be provided with stored topics and parents and children of the topics in a hierarchical relationship. When the original topic needs to be expanded to parent or child topics for use in matching relevant contacts, such parent or child topics can be obtained from the taxonomy database. The taxonomy database may be updated periodically.

Once sufficient relevant contacts are located (68), the relevancy scores of the contacts can be boosted/adjusted (82) according to the topic parents (hypernyms) for each level of expansion (with each additional level being given a reduced boost coefficient). Similarly, the relevancy scores of the contacts can be boosted/adjusted (84) based according to the topic children (hyponyms) for each level of expansion (with each additional level being given a reduced boost coefficient). The user contacts (or the documents) returned using the at least one of the parent or the child topics are weighted less than the user contacts or the documents returned initially from the key word search.

Finally, the relevancy scores of the contact can be boosted (86) based on a perceived or expressly indicated willingness to cooperate. For example, a contact from the same company of the user, same team as the user, same level in the company as the user, having an available communication channel, having a past history of cooperation, within the user's first circle of contacts, and the like may be deemed to have a certain level of willingness to cooperate. After the scoring, boosting of scores, and weightings based on willingness to cooperate, the top N best matches of contacts are returned (19) and added to the relevant people view side bar 34 as discussed above. In an example embodiment wherein the private information source comprises a recommendation engine, the contacts may comprise experts relevant to the key word search returned by the recommendation engine.

A similar process can be implemented for returning relevant documents with weightings based on relevancy for populating the relevant document view side bar. An example of a document recommendation system is set forth in Gartner, Inc.'s U.S. Pat. No. 8,661,034 entitled Bimodal Recommendation Engine for Recommending Items and Peers, which is incorporated herein and made a part hereof by reference for all purposes. The documents returned can be sorted and filtered for relevancy in much the same way as described above for the relevant contacts, with relevancy and scoring/weighting determined with respect to one or more of the key word search, topics derived from the key word search and the search results, and topics obtained through parent/child expansion as discussed in connection with FIG. 5.

Figure 6:
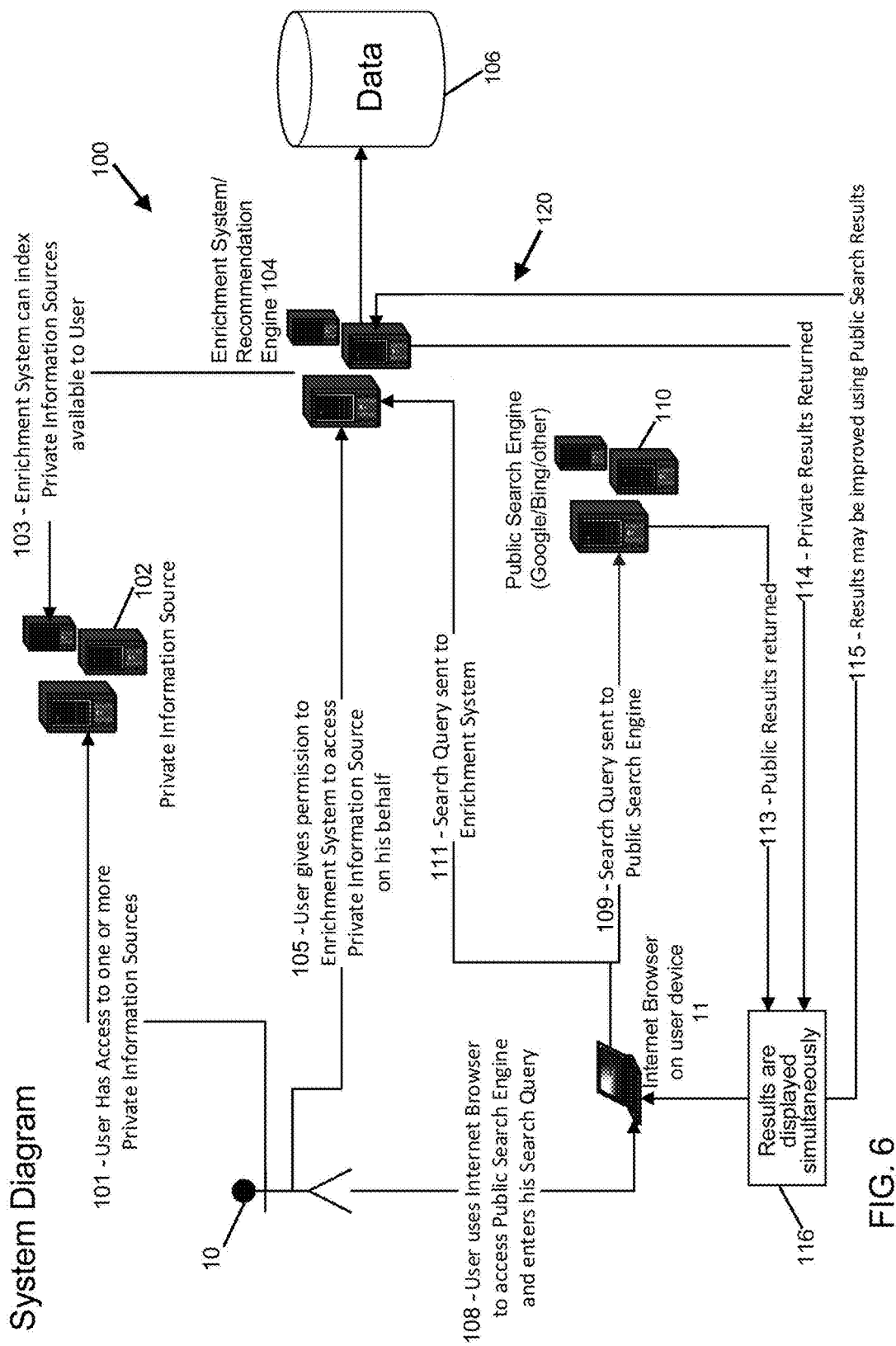
FIG. 6 shows a block diagram of an example embodiment of a system in accordance with the present invention.

FIG. 6 shows a block diagram of an example embodiment of a system 100 in accordance with the present invention. The user 10 has access (101) to various private information sources 102 (as discussed above), which may be indexed (103) by the enrichment system/recommendation engine 104 (as discussed above). The user 10 may provide permissions (105) to the enrichment system 104 to access the private information sources 102 to enable indexing, searching, periodic updating, and the like. Such indexed data and related information for each user may be stored in a database 106 associated with the enrichment system, together with other data typically found in such systems (including but not limited to stored data from past searches, explicit and implicit user profile information, documents, and the like). After permissions are granted and the private information source material is indexed, the system may be used to provide the combined public and private search results as discussed above. The user 10 may access 108 a public search engine 110 using an Internet browser from any Internet enabled user device 11 (e.g., laptop computer, tablet computer, desktop computer, smartphone, smartwatch, or other similar device), and enter a search query. A software application running on the user device 11 may be used to implement a widget or the like in the browser, or a specialized browser may be implemented, providing the people view and/or document view sidebar and linking the search query into the private information source and/or the recommendation engine. The search query is simultaneously sent 109, 111 to both the public search engine 110 and the private search engine (enrichment system/recommendation engine) 104. The public results 113 and private results 114 are then returned 116 by the public and private search engines, respectively, and simultaneously displayed on the browser (e.g., as discussed above in connection with FIG. 2). The public search results may be analyzed 115 and used to further enhance the private search results, as discussed above in connection with FIG. 4.

It should be appreciated that the recommendation engine 104 and the private information source 102 may be separate entities as shown in FIG. 6 or that they may be combined into a single entity. Search results may be returned from one or both of the recommendation engine 104 and the private information source 102, and the system may likewise be implemented with both or only one of the recommendation engine 104 and the private information source 102.

The user device 11 may comprise any type of network or Internet enabled device having a processor, memory, and a user interface which is capable of running a web browser, such as a computer, a laptop computer, a table computer, a smartphone, a smartwatch, or any other type of network enabled computing device. The user device 11, the private information source 102, the recommendation engine 104, and the public search engine 110 may be connected via a network 120. The network 120 may comprise one or more of the Internet, a private network, a local area network, a wide area network, or the like.

Those skilled in the art will appreciate that the example system embodiment shown in FIG. 6 is only one possible implementation of the present invention, and that present invention may be implemented in various different combinations of hardware and software. The recommendation engine described in Gartner, Inc.'s U.S. Pat. No. 8,661,034 may be modified to obtain and index the user contact information and documents as discussed in connection with FIG. 3 above.

It should now be appreciated that the present invention provides advantageous methods and apparatus for simultaneously searching public and private networks and returning search results from both sources.

Although the invention has been described in connection with various illustrated embodiments, numerous modifications and adaptations may be made thereto without departing from the spirit and scope of the invention as set forth in the claims.

What is claimed is:

1. A computerized method for simultaneously searching public and private information sources, comprising:
   implementing, by a user, a key word search of a public search engine via a web browser;
   simultaneously automatically implementing the key word search of a private external information source to locate at least one of user contacts and documents relevant to the key word search;
   scoring the at least one of the user contacts and the documents returned from the private external information source for relevancy to the key word search;
   returning public search results to the user in a main section of a web browser display based on the key word search of the public search engine;
   modifying the web browser display to comprise a side bar viewing window adjacent the main section of the web browser display; and
   returning a predetermined number of most relevant of the at least one of the user contacts and the documents obtained from the private external information source to the user in the side bar viewing window of the web browser display adjacent to the public search results displayed on the main section of the web browser display;
   wherein:
   the scoring of the user contacts and the documents returned from the private external information source further comprises ordering the user contacts and the documents by relevancy to key words or topics derived from at least one of the key word search or the public search results;
   the private external information source comprises a recommendation system comprising at least one of a document recommendation engine comprising a document database for the documents and an expert recommendation engine comprising an expert database identifying experts and corresponding areas of expertise; and
   identifying information for the experts from the expert database which are relevant to the key word search is displayed in the side bar viewing window.

2. The method in accordance with claim 1, further comprising:
   enabling access to the private external information source by automatically logging into the private external information source using stored access information for the private external information source.

3. The method in accordance with claim 1, further comprising:
   connecting to external user accounts;
   analyzing the external user accounts to locate information comprising at least one of the user contacts, contact information, and documents associated with the user contacts;
   indexing the user contacts, the contact information, and the documents; and
   storing the indexed user contacts, the indexed contact information, and the indexed documents.

4. The method in accordance with claim 3, further comprising:
   extracting the information from the external accounts; and
   tagging the extracted information to indicate important topics or areas of strength of the corresponding contact.

5. The method in accordance with claim 4, wherein the information extracted from the external accounts comprises at least one of contact name, photo, bio, experience summary, skill set, background, and associated groups or affiliations.

6. The method in accordance with claim 3, further comprising:
   creating or updating an implicit profile of the user with the indexed user contacts, the indexed contact information, and the indexed documents.

7. The method in accordance with claim 6, wherein the implicit profile comprises user-related information derived from:
   tracking the user's behavior on at least one of one or more electronic devices, an electronic communications network, and a website used to access the recommendation system;
   analyzing the user-related information derived from the user behavior to extract or derive key words therefrom which are used to characterize user interests, expertise, and skills; and
   storing the key words in a profiles database as the implicit profile.

8. The method in accordance with claim 6, further comprising:
   tracking user's actions on the web browser; and
   updating the user's implicit profile based on the user's actions.

9. The method in accordance with claim 8, wherein the user's actions comprise at least one of key word searches entered, the public search results viewed by the user, the user contacts from the private external information source contacted, and the documents returned from the private external information source viewed by the user.

10. The method in accordance with claim 6, wherein at least one of the indexing of the user contacts, the contact information, and the documents and the updating of the implicit profile occurs at least one of periodically, at user login to the private external information source, and upon a change in one of the user external accounts.

11. The method in accordance with claim 3, wherein the user contacts comprise direct user contacts and indirect user contacts obtained or derived from the direct user contacts.

12. The method in accordance with claim 1, wherein the key words or topics are extracted from the at least one of the key word search and the public search results using natural language processing techniques.

13. The method in accordance with claim 1, wherein the user contacts or the documents with relevancy to more than one of the topics or key words are scored higher than the user contacts or the documents having relevancy to only one of the topics or key words.

14. The method in accordance with claim 12, further comprising:
storing information relating to the topics and key words in a database of the recommendation system.

15. The method in accordance with claim 1, wherein in the event at least the predetermined number of the user contacts and/or the documents are not returned in the key word search, further comprising:
deriving one or more topics from the key word search; and
expanding the scope of the search of the private external information source to include at least one parent or child topics corresponding to the one or more topics.

16. The method in accordance with claim 15, the at least one of the parent or the child topics are obtained from a taxonomy database comprised of stored topics together with the parent and the child topics corresponding thereto in a hierarchical relationship.

17. The method in accordance with claim 15, wherein the user contacts or the documents returned using the at least one of the parent or the child topics are weighted less than the user contacts or the documents returned from the key word search.

18. The method in accordance with claim 1, wherein the user contacts which have a perceived or express willingness to cooperate are scored higher than other of the user contacts.

19. The method in accordance with claim 18, wherein the willingness to cooperate is determined by at least one of the user contact being from one of a same company, team, or company level as the user, the user contact having an available communication channel, the user contact having a past history of cooperation, and the user contact being obtained from direct contacts of the user.

20. The method in accordance with claim 1, further comprising:
for each of the user contacts returned from the private external information source, the side bar viewing window of the web browser display displays at least one of a name of the user contact, contact information, embedded links for contacting the contact via email, instant messaging, texting, or telephone, a photo, a bio, a summary of the contact's relevancy to the key word search, an experience summary, a skill set description, a background summary, and a listing of associated groups or affiliations.

21. The method in accordance with claim 1, wherein:
the key word search of the private external information source is implemented via a software widget associated with the web browser or via a specialized web browser adapted to access the private external information source; and
the software widget includes user login information for automatically accessing the private external information source for executing the key word search.

22. A computerized system for simultaneously searching public and private information sources, comprising:
a processor with associated memory capable of running a web browser;
a web browser enabling a user to implement a key word search of a public search engine, the web browser comprising a modified web browser display comprising a main section and a side bar viewing window; and
a software application associated with the web browser for accessing a private external information source and simultaneously implementing the key word search of the private external information source to locate at least one of user contacts and documents relevant to the key word search;
wherein:
the private external information source is adapted to score the at least one of the user contacts and the documents returned from the key word search for relevancy to the key word search;
the scoring of the user contacts and the documents returned from the private external information source further comprises ordering the user contacts and the documents by relevancy to key words or topics derived from at least one of the key word search or the public search results;
the public search results obtained from the key word search of the public search engine are displayed on the main section of the web browser display;
a predetermined number of most relevant of the at least one of the user contacts and the documents obtained from the private external information source are displayed in the side bar viewing window of the web browser display adjacent to the public search results displayed on the main section of the web browser display;
the private external information source comprises a recommendation system comprising at least one of a document recommendation engine comprising a document database for the documents and an expert recommendation engine comprising an expert database identifying experts and corresponding areas of expertise; and
identifying information for the experts from the expert database which are relevant to the key word search is displayed in the side bar viewing window.

23. The system in accordance with claim 22, wherein:
the recommendation system is provided with access information for connecting to external user accounts;
the recommendation system accesses the external user accounts to locate at least one of the user contacts, contact information, and documents associated with the user contacts;
the recommendation system indexes the user contacts, the contact information, and the documents; and
the recommendation system stores the indexed user contacts, the indexed contact information, and the indexed documents.

* * * * *